United States Patent
Vajravel

(10) Patent No.: US 10,142,425 B2
(45) Date of Patent: Nov. 27, 2018

(54) SESSION RELIABILITY FOR A REDIRECTED USB DEVICE

(71) Applicant: Wyse Technology L.L.C., Santa Clara, CA (US)

(72) Inventor: Gokul Thiruchengode Vajravel, Bangalore (IN)

(73) Assignee: Wyse Technology L.L.C., Santa Clara, CA (US)

( * ) Notice: Subject to any disclaimer, the term of this patent is extended or adjusted under 35 U.S.C. 154(b) by 202 days.

(21) Appl. No.: 15/162,019

(22) Filed: May 23, 2016

(65) Prior Publication Data
US 2017/0339234 A1    Nov. 23, 2017

(51) Int. Cl.
G06F 13/16    (2006.01)
H04L 29/08    (2006.01)
G06F 9/455    (2018.01)

(52) U.S. Cl.
CPC ........ *H04L 67/141* (2013.01); *G06F 9/45558* (2013.01); *G06F 13/1642* (2013.01); *H04L 67/145* (2013.01); *G06F 2009/45579* (2013.01)

(58) Field of Classification Search
CPC ............ G06F 9/45558; G06F 12/0866; G06F 2009/45579; G06F 9/4413; G06F 13/1642; G06F 13/4282; G06F 3/061; G06F 9/44505; G06F 9/45533; G06F 2213/0042; H04L 67/141; H04L 67/145; H04L 67/2814; H04L 67/08; H04L 67/025; H04L 41/08; H04L 41/0803; H04L 65/1083

See application file for complete search history.

(56) References Cited

U.S. PATENT DOCUMENTS

| | | | | |
|---|---|---|---|---|
| 6,732,212 B2* | 5/2004 | Sugahara | ................ | G06F 13/24 709/217 |
| 8,365,168 B1* | 1/2013 | Kodorkin | ............ | G06F 9/45558 718/1 |
| 9,036,509 B1* | 5/2015 | Addepalli | ............. | H04W 4/046 370/259 |
| 2002/0143921 A1* | 10/2002 | Stephan | .............. | G06F 13/4081 709/223 |
| 2003/0229900 A1* | 12/2003 | Reisman | ........... | G06F 17/30873 725/87 |

(Continued)

*Primary Examiner* — Sargon N Nano
(74) *Attorney, Agent, or Firm* — Kirton McConkie; Brian Tucker

(57) ABSTRACT

Session reliability can be improved when a USB device is redirected over a remote session. If a remote session is disconnected while a USB device is redirected over the remote session, a server-side agent and a client-side proxy will both receive a session disconnection notification. In response to this session disconnection notification, the agent and the proxy can each queue any I/O requests pertaining to a USB device that was being redirected over the now-disconnected remote session and commence waiting for a specified period of time. If the disconnected remote session is restored within the specified period of time, the agent and the proxy can send the queued I/O requests over the remote session. Otherwise, the agent and proxy can cause the queued I/O requests to be completed with the proper error status or discarded and can take appropriate steps to remove the device from the server and connect the device to the client.

20 Claims, 9 Drawing Sheets

(56) References Cited

U.S. PATENT DOCUMENTS

| | | | |
|---|---|---|---|
| 2004/0239986 A1* | 12/2004 | Wise | G06F 3/122 358/1.15 |
| 2006/0069750 A1* | 3/2006 | Momtchilov | H04L 67/08 709/219 |
| 2006/0230236 A1* | 10/2006 | Finkelstein | G06F 12/0862 711/137 |
| 2007/0061477 A1* | 3/2007 | Stoyanov | G06F 9/4411 709/230 |
| 2008/0071962 A1* | 3/2008 | Yang | G06F 9/4411 710/313 |
| 2009/0043921 A1* | 2/2009 | Roy | G06F 13/385 710/31 |
| 2009/0150550 A1* | 6/2009 | Barreto | H04L 29/08846 709/228 |
| 2009/0205000 A1* | 8/2009 | Christensen | H04N 21/8456 725/61 |
| 2010/0070634 A1* | 3/2010 | Ranjan | H04L 63/0869 709/228 |
| 2010/0146076 A1* | 6/2010 | Adriazola | H04L 65/4084 709/219 |
| 2012/0158822 A1* | 6/2012 | Dai | G06F 9/4413 709/203 |
| 2015/0244766 A1* | 8/2015 | Kaushik | H04L 63/105 709/219 |
| 2016/0099948 A1* | 4/2016 | Ott | G06F 9/4445 726/1 |

* cited by examiner

SESSION RELIABILITY FOR A REDIRECTED USB DEVICE

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1 and 2 and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client side, the desktop running on server 104 may represent a virtual desktop environment.

FIG. 2 is a block diagram of a virtual desktop infrastructure environment 200 in accordance with embodiments of the present invention. Environment 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a user session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106. Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a user session through which client 102 is connected to server 104, such as a session number or a session locally unique identifier (LUID). Agent 250 can provide notification of device 240, along with the device information, to virtual bus driver 260. Virtual bus driver 260 (which may be a TCX USB bus driver, or any other bus driver) may be configured to create and store in memory a record corresponding to device 240, the record including at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281*a*, 281*b*, . . . , 281*n*, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282*a*, 282*b*, . . . 282*n*, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281*a* stating that a new device has been plugged in. Next, a plug-and-play (PNP) component of the operating system will search for and load the best driver for device 240, which will create another device object 281*b* that is layered over the previous device object 281*a*. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a user session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

A unidirectional USB device is a device which works as either an input or output device but not both. For example, printers, signature pads, and scanners are unidirectional devices while mass storage devices are bidirectional devices. When a unidirectional USB device is redirected, the reliability of the USB device is tied to the reliability of the remote session over which it is redirected. In some cases, the network over which the remote session is established may be subject to relatively frequent disconnections of short duration (e.g., between 5 and 60 seconds). This is particular true of wide area networks such as the internet.

To address this issue, many VDI solutions implement techniques for restoring a remote session that has been temporarily disconnected. For example, the client-side proxy and server-side agent can be configured to attempt to restore a disconnected remote session for a period of time after the disconnection (e.g., 5-60 seconds). If the disconnected remote session is restored, there may be little impact on the user experience since the user will not be required to establish a new remote session. However, if a USB device is being redirected over the remote session when the remote session is disconnected, the server-side agent will take immediate action to remove the redirected device from server. For example, with reference to FIG. 2, if the remote session between proxy 210 and agent 250 is disconnected even for a very short period of time, agent 250 will generate a device removal notification that it sends to virtual bus driver 260 to cause virtual device 290 to be removed from server 104.

If the disconnected remote session is restored, the removed USB device can also be reconnected. In spite of this, because the USB device is removed, any I/O to/from the device that was pending when the disconnect occurred will never be completed. This can create a number of problems based on the type of USB device and the type of application/service that was attempting to access the device. For example, an application that was expecting input from a redirected USB device may hang indefinitely (e.g., in the case of an electronic signature application waiting for a signature form a redirected USB signature pad), or may even crash or close (e.g., in the case of a scanner application that is awaiting input from a redirected USB scanner).

Also, because the redirected USB device is removed from the server, when it is reconnected, it will likely cause the device driver(s) to be reinstalled on the server (because the device will be treated as being newly connected). The reconnection of the USB device may also cause the re-enumeration of connected devices at the server. Therefore, in scenarios where the remote session may be established over a low quality internet connection (e.g., when the client is located at a user's home), a redirected device may be removed and then reconnected relatively frequently leading to the frequent occurrence of the above-identified problems. For this reason, many VDI providers do not support USB device redirection over wide area networks.

BRIEF SUMMARY

The present invention extends to methods, systems, and computer program products for improving session reliability when a USB device is redirected over a remote session. If a remote session is disconnected while a USB device is redirected over the remote session, a server-side agent and a client-side proxy will both receive a session disconnection notification. In response to this session disconnection notification, the agent and the proxy can each queue any I/O requests pertaining to a USB device that was being redirected over the now-disconnected remote session and commence waiting for a specified period of time. If the disconnected remote session is restored within the specified period of time, the agent and the proxy can send the queued I/O requests over the remote session. Otherwise, the agent and proxy can cause the queued I/O requests to be completed with the proper error status or discarded and can take appropriate steps to remove the device from the server and connect the device to the client.

In one embodiment, the present invention is implemented by a client-side proxy in a virtual desktop infrastructure environment as a method for enabling I/O requests pertaining to a device that is redirected to a server over a remote session to be resumed when the remote session has become disconnected and then restored. A remote session can be established with an agent on a server. A device can be redirected over the remote session. It can then be determined that the remote session has been disconnected. In response to the remote session being disconnected, one or more I/O requests received from the device can be queued. It can then be determined whether the remote session is restored within a specified amount of time such that: when the remote session is restored within the specified amount of time, the proxy sends the queued I/O requests over the remote session to the agent; and when the remote session is not restored within the specified amount of time, the proxy discards the queued I/O requests and causes the device to be connected to the client.

In another embodiment, the present invention is implemented by a server-side agent in a virtual desktop infrastructure environment as a method for enabling I/O requests pertaining to a device that is redirected to the server over a remote session to be resumed when the remote session has become disconnected and then restored. A remote session can be established with a proxy on a client. A device can be redirected over the remote session. It can then be detected that the remote session has been disconnected. In response to the remote session being disconnected, one or more I/O requests directed to the device can be queued. It can then be determined whether the remote session is restored within a specified amount of time such that: when the remote session is restored within the specified amount of time, the agent sends the queued I/O requests over the remote session to the proxy; and when the remote session is not restored within the specified amount of time, the agent completes the I/O requests with an error status and initiates a device removal process to remove the redirected device from the server.

In another embodiment, the present invention is implemented as a virtual desktop infrastructure environment comprising: a proxy that is configured to execute on a client; and an agent that is configured to execute on a server. The proxy and agent interact to establish a remote session including to redirect a device to the server for use within the remote session. When the remote session is disconnected, the proxy and the agent are each configured to enable I/O requests pertaining to the device to be resumed after the remote session is restored by performing the following: queuing any I/O requests pertaining to the device that are received after the remote session is disconnected; waiting for a specified amount of time after the remote session is disconnected; and when the remote session is restored prior to the specified amount of time elapsing, sending the queued I/O requests over the restored remote session.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
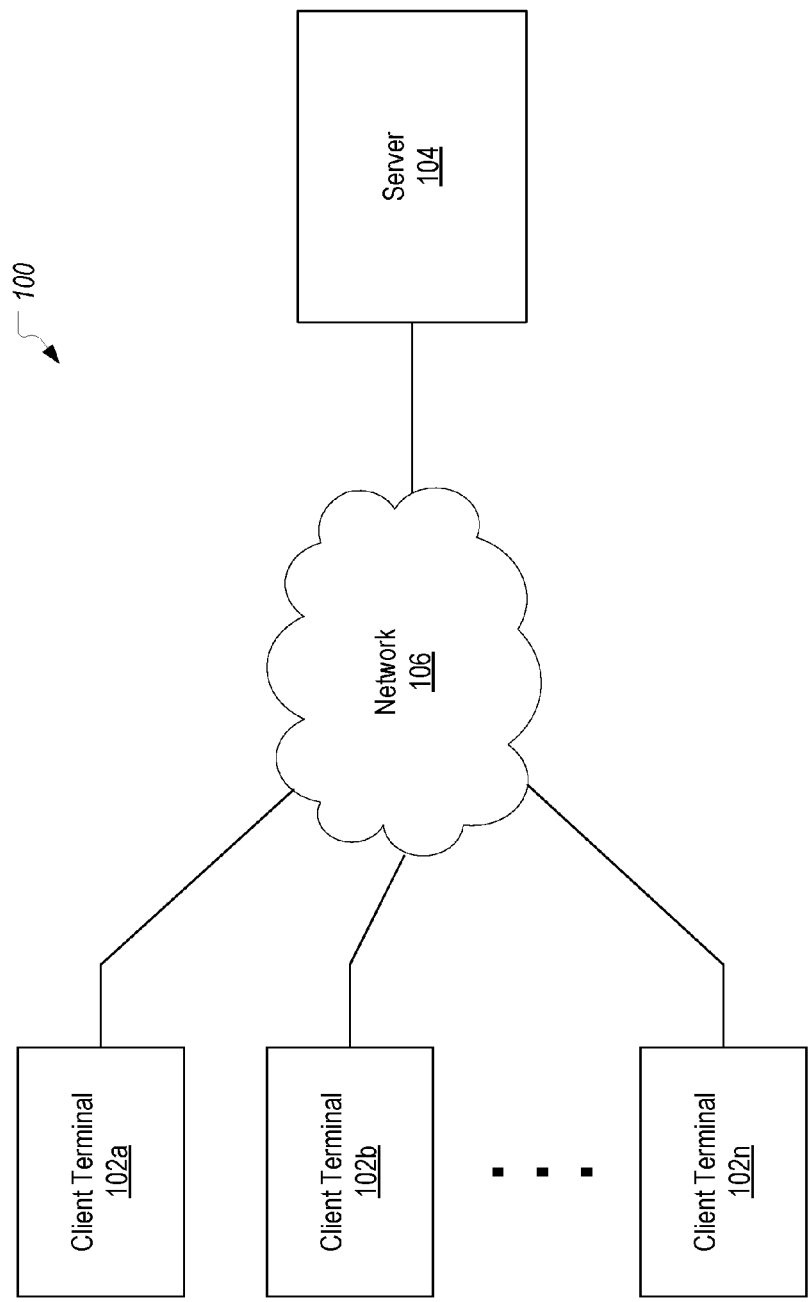
FIG. 1 illustrates an example computing environment in which the present invention can be implemented.
Figure 2:
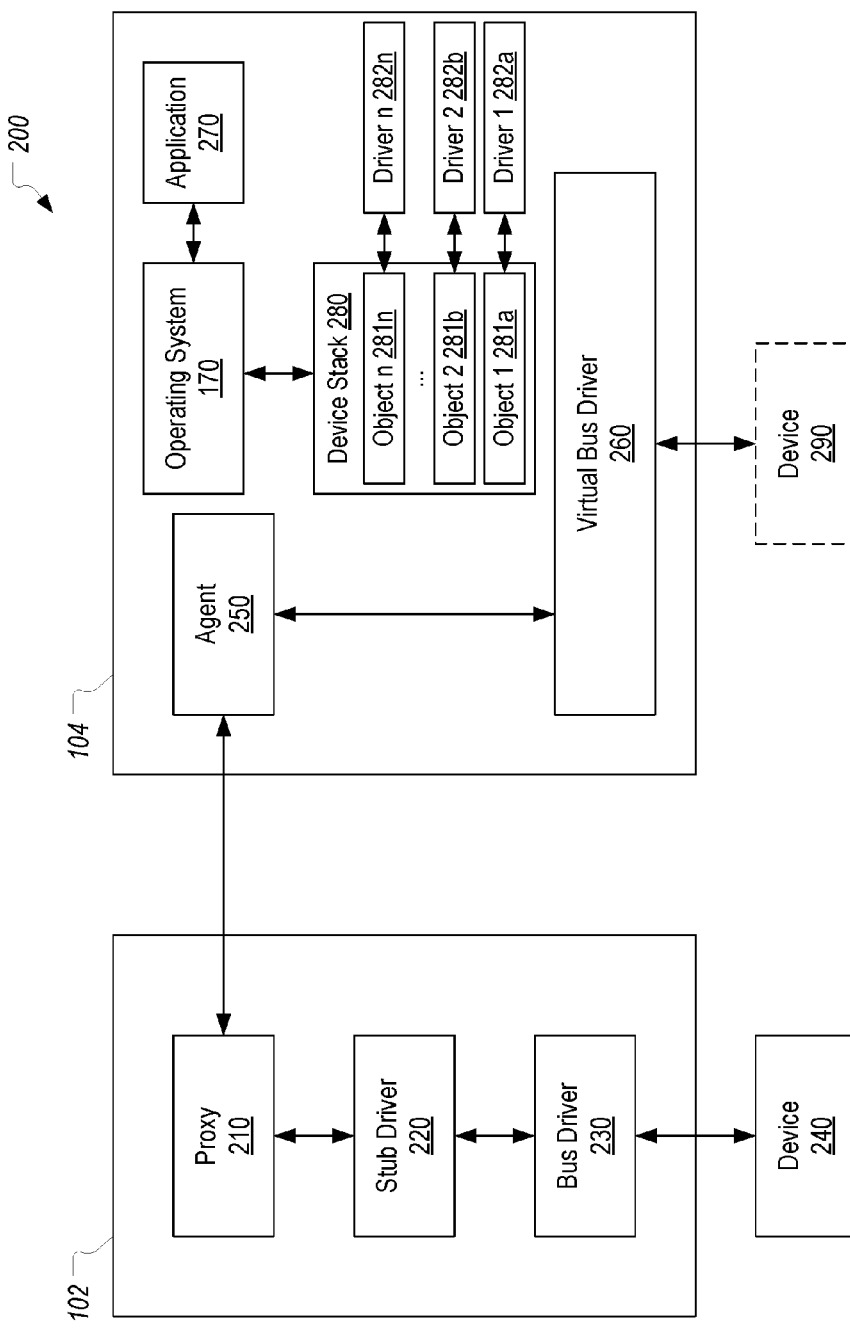
FIG. 2 illustrates how a USB device can be redirected from a client terminal to a server.

The present invention will be primarily described as being implemented when a remote session, over which a unidirectional USB device is being redirected, is disconnected. However, the techniques of the present invention, in some cases, could be applied when the redirected USB device is a bidirectional USB device. The present invention can be implemented regardless of the protocol used to establish the remote session. Also, although the present invention is primarily beneficial when the remote session is established over a wide area network, the present invention can be implemented regardless of the type of network.

FIGS. 3A-3E provide an example of the functionality that a client-side proxy and a server-side agent can perform to allow I/O requests to be resumed when a disconnected remote session is restored. FIGS. 3A-3E depict a client 302 and a server 304 that are configured in substantially the same manner as client 102 and server 104 as described above. Many of the components on client 302 and server 304 are not shown for simplicity. However, it should be understood that client 302 and server 304 would include the necessary components for implementing USB device redirection (e.g., stub driver 220 and the appropriate driver stack on server 304).

Client 302 can include a proxy 310 and server 304 can include an agent 350 that are each specifically configured to implement the functionality described herein. The remaining components on client 302 and server 304 can operate in a substantially typical manner. In other words, the functionality performed by client 302 and server 304 can allow I/O requests to be resumed after a session disconnect in a manner that is largely transparent to the remaining components.

Figure 3A:
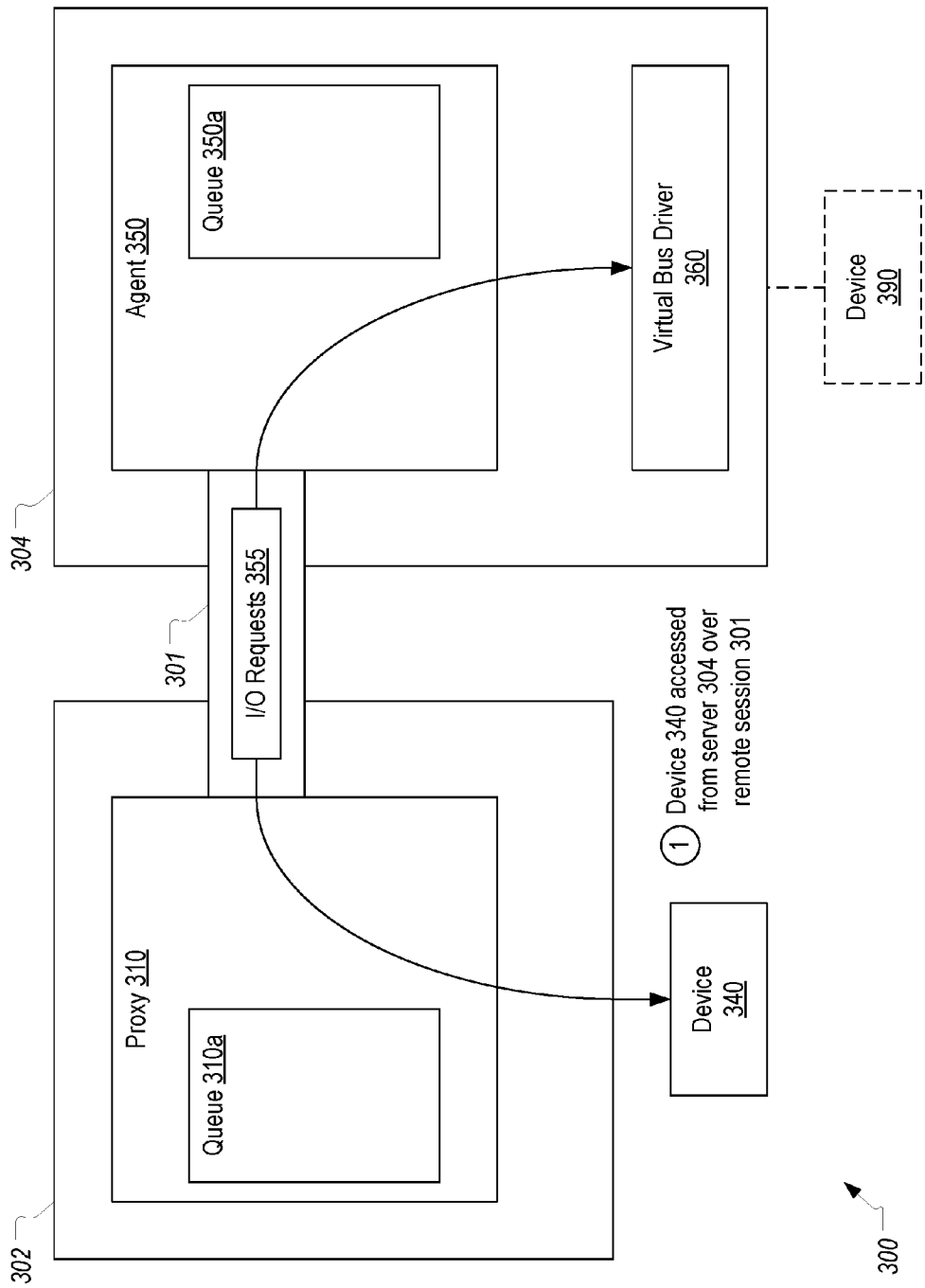
FIGS. 3A-3E illustrate an example of how the client-side proxy and the server-side agent can respond when a remote session is disconnected to allow I/O requests pertaining to a redirected USB device to be resumed when the remote session is reconnected.

As shown in FIG. 3A, proxy 310 and agent 350 have established a remote session 301. As indicated above, remote session 301 would oftentimes be established over a wide area network, such as the internet, that is subject to relatively frequent disruptions. However, remote session 301 could be established over any type of network including a local area network that may experience relatively few disruptions. FIG. 3A also shows that a USB device 340 is physically connected to client 302 and is being redirected to server 304 via remote session 301. As a result, virtual USB device 390 will appear on server 304 for use by applications executing within remote session 301 (and possibly applications executing within other sessions).

FIG. 3A depicts a step 1 representing that device 340 is accessed from server 304 (e.g., by an application executing within remote session 301). As a result of this access, one or more I/O requests 355 will be transferred over remote session 301. For purposes of this specification and the claims, the term "I/O requests" will be used to generally refer to any type of I/O communication that is transferred between device 340 and an application/service on server 304. For example, if device 340 is a printer, the print spooler service executing on server 304 can send print requests to device 340 and device 340 can send back any necessary responses. In this example, the print requests and any responses can both be considered I/O requests. Similarly, if device 340 is a scanner, an application on server 304 could send a request to scan a document and device 340 could send back the scanned image data. In this example, the scan request and the image data can also both be considered I/O requests. The reason for employing the term I/O request in this general manner is that the functionality performed by proxy 310 and agent 350 is substantially identical regardless of whether device 340 is an input device or an output device.

Returning to FIG. 3A, I/O requests 355 can include I/O requests that originate at device 340 and are directed towards an application/service on server 304. In such cases, the I/O requests would be routed over remote session 301 to agent 350 which would then direct the I/O requests to virtual bus driver 360 for routing to the appropriate driver(s). Additionally, I/O requests 355 can include I/O requests that originate from an application/service on server 304 and are directed towards device 340 (or, from the perspective of the application/service, towards virtual device 390). In such cases, the I/O requests would be routed over remote session 301 to proxy 310 which would then direct the I/O requests to device 340 (e.g., via stub driver 220 and bus driver 230).

Figure 3B:
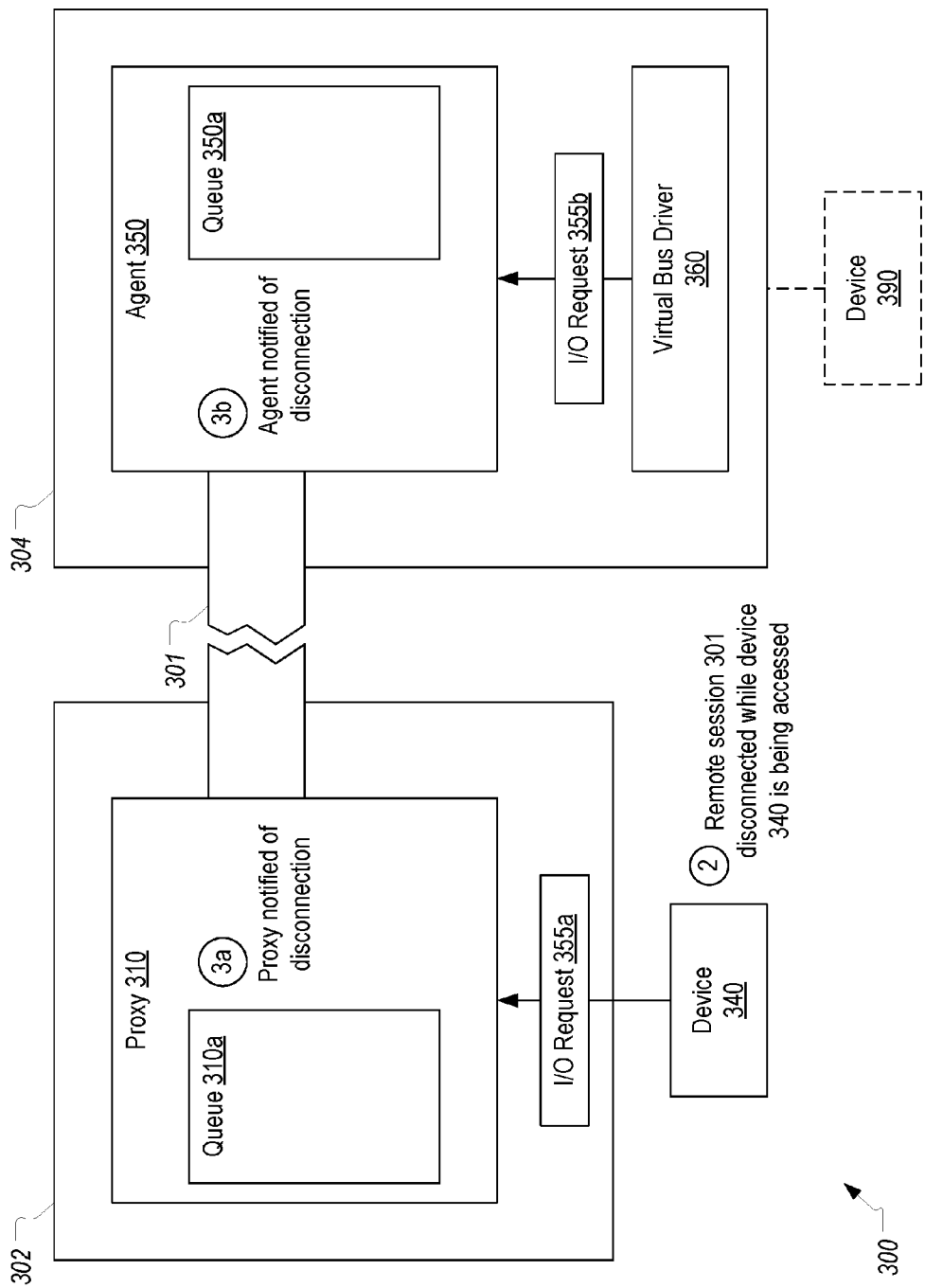

Turning to FIG. 3B, while this access of device 340 is occurring, remote session 301 is disconnected for some reason as represented by step 2 (e.g., due to client 302 or server 304 temporarily losing its internet connection, due to lost packets, due to high latency, etc.). When this disconnection occurs, both proxy 310 and agent 350 will receive a session disconnect notification as represented by steps 3a and 3b. Because device 340 was being accessed when the disconnection occurs, it is likely that an application/service on server 304 will be in the process of sending I/O requests to device 340 and that device 340 will be in the process of sending corresponding I/O requests (e.g., responses) back to the application/service. This is depicted in FIG. 3B with I/O request 355a being delivered towards proxy 310 and I/O request 355b being delivered towards agent 350. For simplicity, only a single I/O request is shown on each of client 302 and server 304. However, device 340 and the application/service on server 304 could continue to generate any number of I/O requests after remote session 301 becomes disconnected.

In accordance with prior art techniques, in response to being notified of the session disconnect, proxy 310 would discard any pending I/O requests from device 340 and would cause device 340 to be brought back to client 302 (i.e., to be locally connected rather than redirected). Similarly, in prior art techniques, agent 350 would respond to the session disconnection by causing any pending I/O requests to device 340 to be completed with an error status (e.g., device removed) and would remove virtual device 390 from server 340. These prior art techniques would result in the problems identified in the background.

Figure 3C:
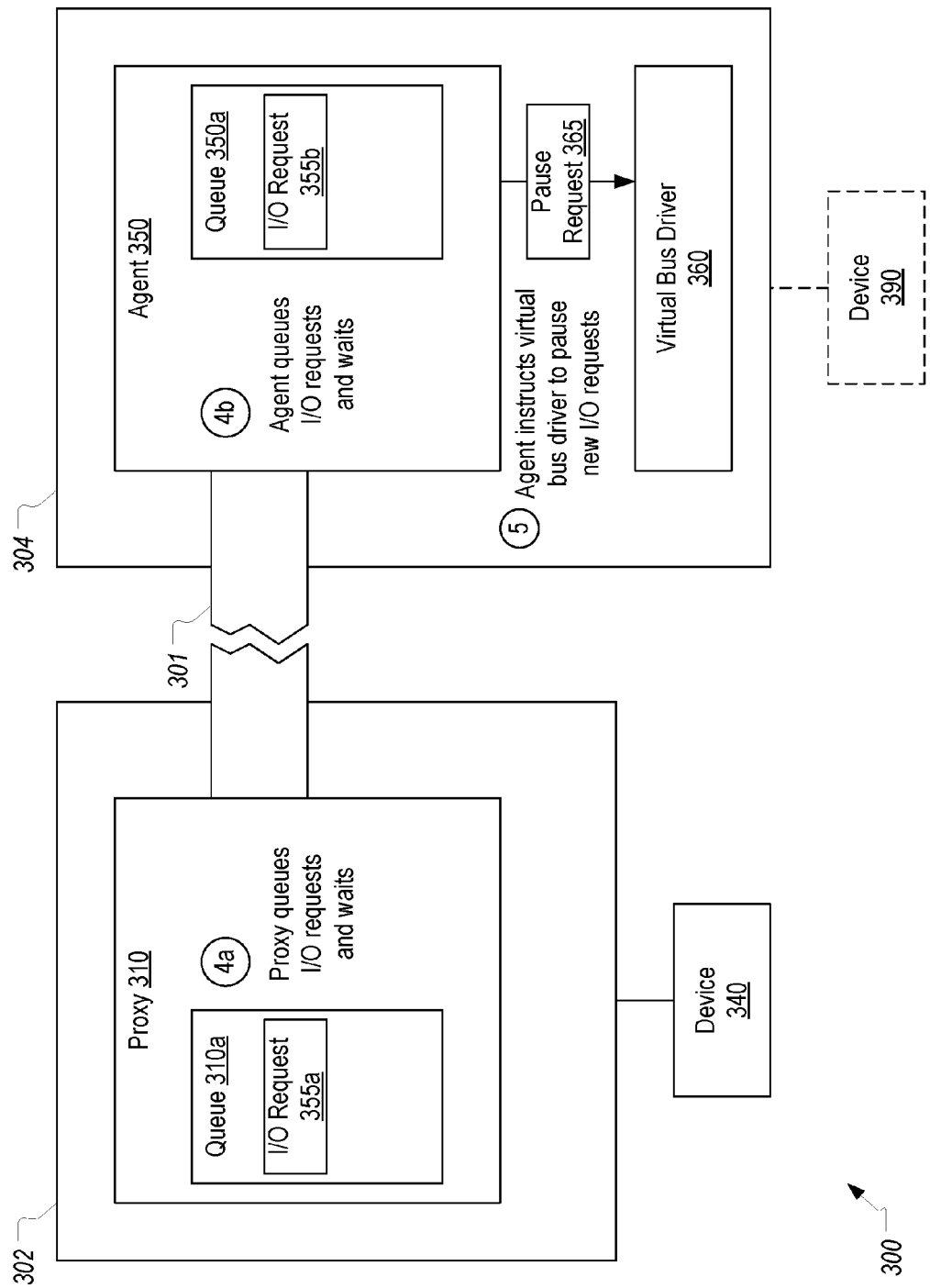
Figure 3D:
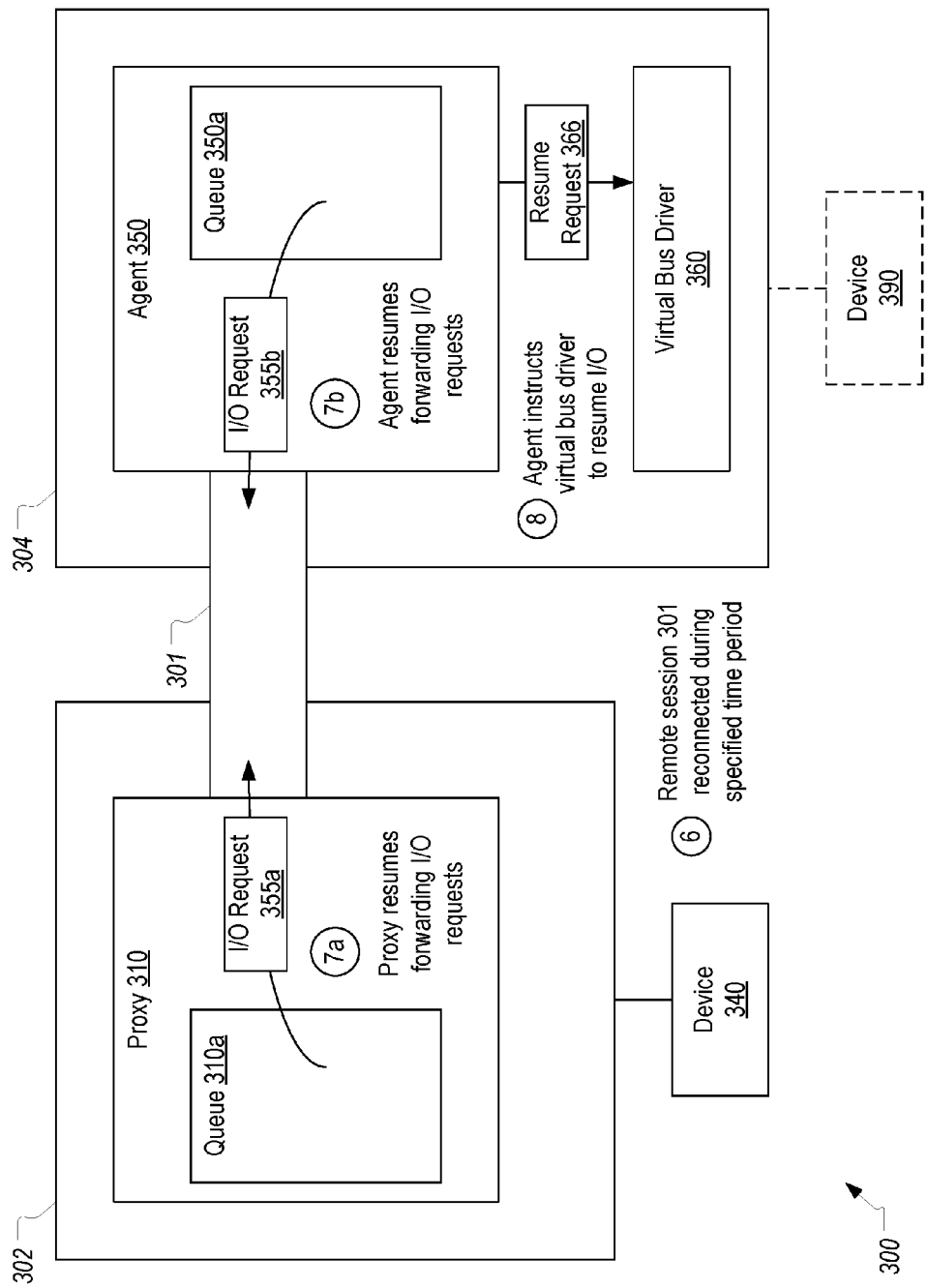

In contrast, in accordance with embodiments of the present invention, and as represented as steps 4a and 4b in FIG. 3C, proxy 310 and agent 350 can respond to the session disconnect notification by queuing any pending I/O requests pertaining to device 340 and then waiting for a specified period of time (e.g., 5 to 30 seconds) to allow remote session 301 to be restored. Additionally, agent 350 can instruct virtual bus driver 360 to pause any new I/O requests to device 340 as represented in step 5. For example, FIG. 3C shows that proxy 310 has stored I/O request 355a in queue 310a. Agent 350 has also stored I/O request 355b in queue 350a and has sent a pause request 365 to virtual bus driver 360. In response to pause request 365, virtual bus driver 360 can commence completing any new I/O request directed to device 340 with a retry-error-status thereby causing these I/O requests to be retried at the device driver stack level during this waiting period. In other words, after pause request 365 is received, virtual bus driver 360 will respond to any new I/O request that it receives from device 340's driver stack with an error indicating that the I/O request should be retried thus in effect causing these I/O requests to be paused.

To summarize, during this waiting period, both proxy 310 and agent 350 will queue any I/O requests from/to device 340 that they may receive, while agent 350 will cause any new I/O requests for device 340 to be momentarily "paused" so that these new I/O requests will not reach agent 350.

Both proxy 310 and agent 350 can maintain a timer to track the amount of time that has elapsed since the session disconnect notification was received. Proxy 310 and agent 350 can employ such timers to wait for a specified amount of time to allow remote session 301 to be restored. If remote session 301 is restored within the specified amount of time as represented in step 6 in FIG. 3D, both proxy 310 and agent 350 can take steps to resume the queued I/O requests. In contrast, if remote session 301 is not restored within the specified amount of time as represented in step 6 in FIG. 3E, both proxy 310 and agent 350 can take appropriate steps to fail the I/O requests.

If remote session 301 is restored within the specified amount of time, proxy 310 can reconnect device 340 to server 304 via remote session 301. As part of reconnecting device 340 to server 304, proxy 310 will send device 340's "device information" to agent 350 in a similar manner as described in the background. However, rather than employing this device information to cause virtual device 390 to be installed on server 304 (which would be the case if device 340 were being newly redirected), agent 350 can employ the device information to verify that the same device 340 is being reconnected. In other words, agent 350 can validate whether the same device is still being redirected over the same session. In some embodiments, this validation can be performed by ensuring that the USB descriptors received when a device is reconnected match USB descriptors that were previously received when the device was originally connected (which previously received device information agent 350 would have stored). In some embodiments, this comparison can also involve matching a session Id associated with the newly received USB descriptors to a session Id associated with the previously received USB descriptors which will indicate that the same device is being directed over the same (or restored) session. This validation process can be performed to ensure that the queued I/O requests will only be resumed over the restored remote session if the same device has been reconnected.

Returning to FIG. 3D, which depicts the case when remote session 301 is restored (and device 340 is reconnected to server 304) within the specified amount of time, upon determining that remote session 301 has been restored, both proxy 310 and agent 350 can commence sending any queued I/O requests. For example, proxy 310 can send I/O request 355a to agent 350 for delivery to the appropriate application/service on server 304 as represented in step 7a, and agent 350 can send I/O request 355b to proxy 310 for delivery to device 340 as represented in step 7b. Additionally, as shown in step 8, agent 350 can send a resume request 366 to virtual bus driver 360. In response to resume request 366, virtual bus driver 360 can cease completing new I/O requests for device 340 with the retry error status such that these new requests will be routed to agent 350 for transmission over remote session 301 to proxy 310. Similarly, proxy 310 can forward any new I/O request it may receive from device 340. In this way, the I/O is resumed with minimal disruption and without needing to restart any I/O (let alone reinstall the disconnected device). Therefore, from the user's perspective, it may not even appear as if device 340 had been disconnected.

Figure 3E:
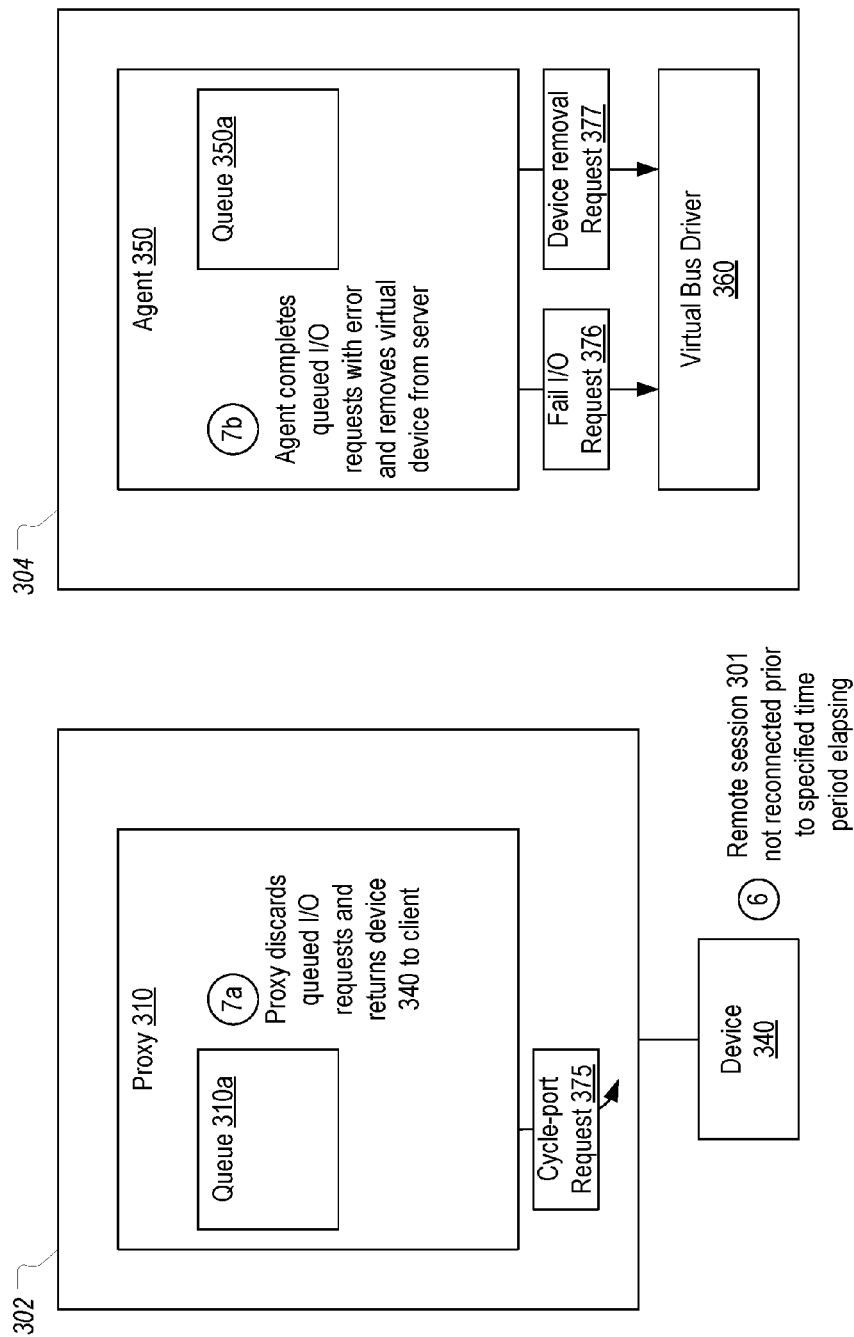

In contrast, FIG. 3E depicts the steps that proxy 310 and agent 350 can perform when remote session 301 is not restored within the specified amount of time as represented by alternate step 6. If proxy 310 determines that the specified amount of time has elapsed and remote session 301 has not been restored, proxy 310 can discard any queued I/O requests (e.g., I/O request 355a) and cause device 340 to be returned to client 302 as represented in alternate step 7a. In some embodiments, discarding any queued I/O requests can include completing the I/O request with an appropriate error status although this may not be necessary in many situations. In some embodiments, to return device 340 to client 302, proxy 310 can initiate the IOCTL_INTERNAL_USB_CYCLE_PORT I/O control request (as represented by cycle-port request 375) which simulates a device unplug and replug on the port associated with the physical device object (PDO). In other words, when this I/O control request is initiated, client 302 will treat device 340 as having been newly connected and will therefore initiate a plug-and-play routine to load the appropriate drivers (which in this scenario will be drivers that cause device 340 to remain locally connected rather than redirected).

Similarly, if agent 350 determines that the specified amount of time has elapsed and remote session 301 has not been restored, agent 350 can complete any queued I/O requests (e.g., I/O request 355b) with the appropriate error status (e.g., device removed) and can also remove virtual device 390 from server 304 as represented in alternate step 7b. For example, agent 350 can send fail I/O request 376 to virtual bus driver 360 which can cause I/O request 355b to be completed with the proper error status. Agent 350 can also send device removal request 377 to virtual bus driver 360 to initiate the process of removing virtual device 390 from server 304.

To summarize, the present invention delays the process of removing a redirected device to allow I/O to the device to be resumed if the remote session is restored. In this way, the occurrence of device re-enumeration, application hanging or crashing, or driver reinstallation can be reduced.

Figure 4:
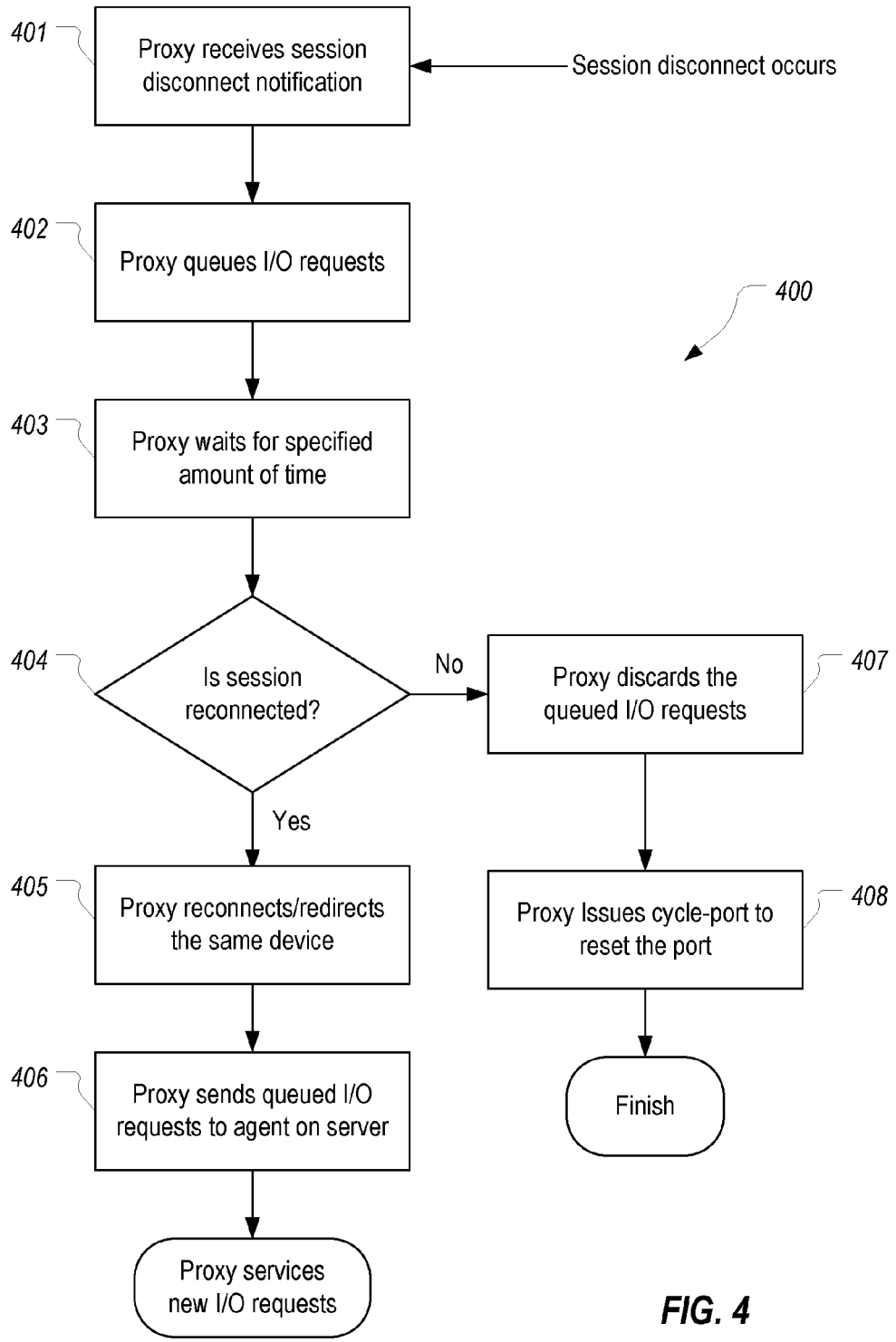
FIG. 4 provides a flow diagram of a process performed by the client-side proxy when a remote session, over which a USB device is redirected, is disconnected.

FIG. 4 provides a flow diagram of a process 400 performed by the client-side proxy when a remote session, over which a USB device is redirected, is disconnected. In step 401, the proxy receives a session disconnect notification. Then, in step 402, the proxy can queue any I/O requests that have been received from the now-disconnected device. Also, in step 403, the proxy can commence waiting for a specified amount of time to see whether the remote session is restored (e.g., by setting a timer). During and/or after the specified amount of time, the proxy can determine whether the remote session has been restored in step 404. If the remote session has been restored, the proxy can reconnect/redirect the disconnected device in step 405 and send the queued I/O requests to the server-side agent in step 406. At this point, the proxy can continue to forward any new I/O requests in a standard manner.

In contrast, if the remote session is not restored within the specified amount of time, the proxy can discard any queued I/O requests in step 407 and issue a cycle-port to cause the device to be connected to the client in step 408. At this point, the device could be used in a standard manner on the client.

Figure 5:
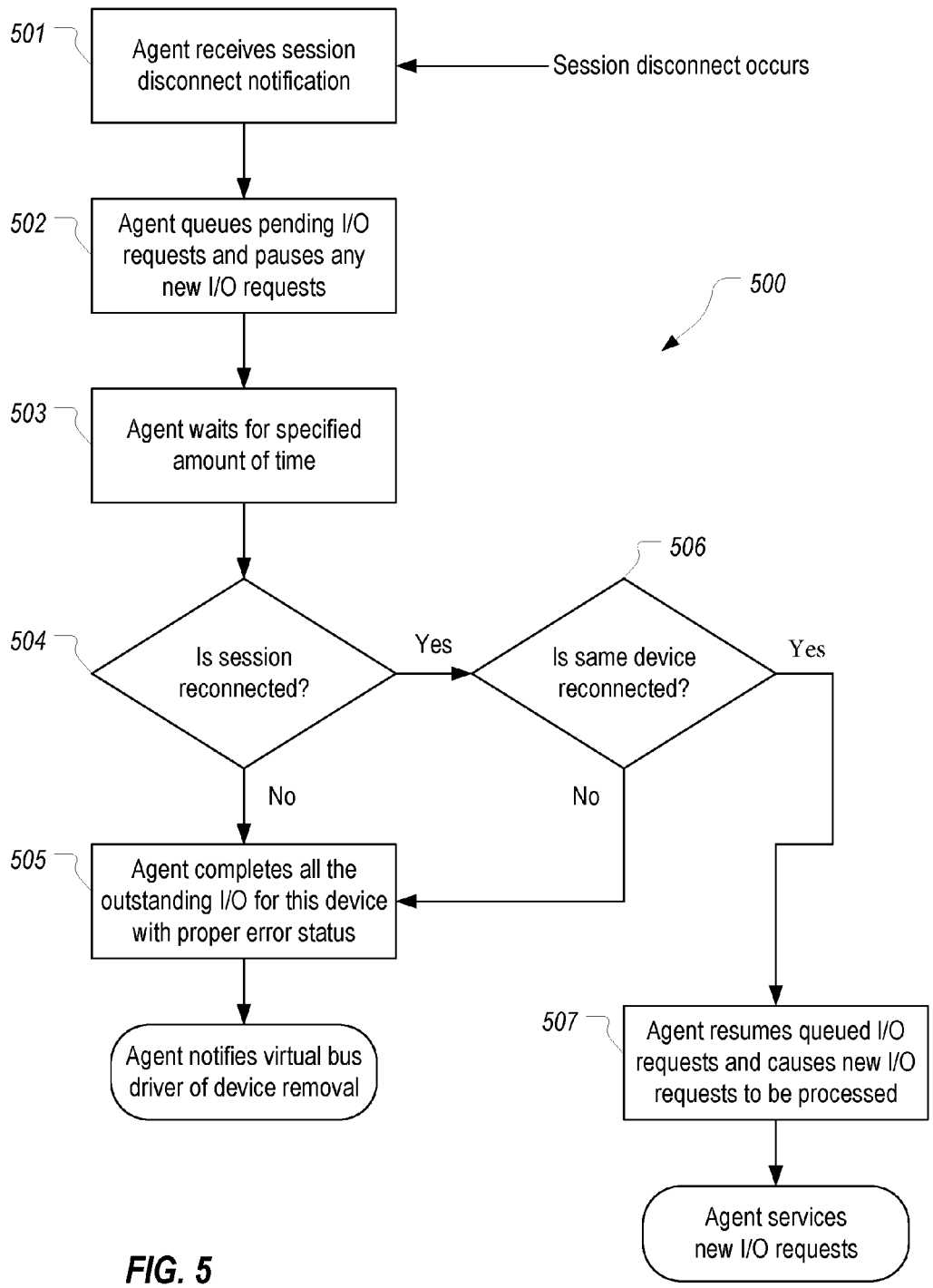
FIG. 5 provides a flow diagram of a process performed by the server-side agent when a remote session, over which a USB device is redirected, is disconnected.

FIG. 5 provides a flow diagram of a process 500 performed by the server-side agent when a remote session, over which a USB device is redirected, is disconnected. In step 501, the agent receives a session disconnect notification. Although not represented in this flow diagram, in response to this notification, the agent can determine that a device was being redirected over the now-disconnected remote session. Then, in step 502, the agent can queue any I/O requests that are directed to the disconnected device and instruct the virtual bus driver to pause any new I/O to the disconnected device. It is noted that these steps are taken in place of commencing a device removal process.

Additionally, in response to the session disconnect notification, the agent can commence waiting, in step 503, for a specified amount of time to see whether the remote session is restored. During and/or after the specified amount of time, the agent can determine whether the remote session has been restored in step 504. If not, the agent can complete the queued I/O requests with an error status in step 505. The agent can then commence the device removal process.

In contrast, if the agent determines that the remote session is restored within the specified amount of time, the agent can determine whether the same device is reconnected over the restored remote session in step 506. If the same device is not reconnected, step 505 can be performed. However, if the same device is reconnected, the agent can send the queued I/O requests to the proxy and also instruct the virtual bus driver to allow any new I/O requests to be processed and forwarded on to the agent in step 507. The agent can then commence operating in a standard manner by forwarding all new I/O requests to proxy 310.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a client-side proxy in a virtual desktop infrastructure environment, for enabling I/O requests pertaining to a device that is redirected to a server over a remote session to be resumed when the remote session has become disconnected and then restored, the method comprising:
    establishing a remote session with an agent on a server;
    redirecting a device over the remote session;
    detecting that the remote session has been disconnected;
    in response to the remote session being disconnected, queueing one or more I/O requests received from the device; and
    determining whether the remote session is restored within a specified amount of time such that:
        when the remote session is restored within the specified amount of time, the proxy sends the queued I/O requests over the remote session to the agent; and
        when the remote session is not restored within the specified amount of time, the proxy discards the queued I/O requests and causes the device to be connected to the client.

2. The method of claim 1, wherein the device is a unidirectional USB device.

3. The method of claim 1, wherein detecting that the remote session has been disconnected comprises receiving a session disconnect notification.

4. The method of claim 1, wherein the specified amount of time comprises a session reconnection time period during which the proxy attempts to restore the remote session.

5. The method of claim 1, wherein, when the remote session is restored within the specified amount of time, the proxy reconnects the device to the server.

6. The method of claim 5, wherein reconnecting the device to the server comprises sending device information to the agent.

7. The method of claim 1, wherein discarding the queued I/O requests comprises completing at least one of the queued I/O requests with an error status.

8. The method of claim 1, wherein causing the device to be connected to the client comprises initiating a cycle-port I/O control request.

9. A method, implemented by a server-side agent in a virtual desktop infrastructure environment, for enabling I/O requests pertaining to a device that is redirected to the server over a remote session to be resumed when the remote session has become disconnected and then restored, the method comprising:
   establishing a remote session with a proxy on a client;
   redirecting a device over the remote session;
   detecting that the remote session has been disconnected;
   in response to the remote session being disconnected, queueing one or more I/O requests directed to the device; and
   determining whether the remote session is restored within a specified amount of time such that:
      when the remote session is restored within the specified amount of time, the agent sends the queued I/O requests over the remote session to the proxy; and
      when the remote session is not restored within the specified amount of time, the agent completes the I/O requests with an error status and initiates a device removal process to remove the redirected device from the server.

10. The method of claim 9, wherein the device is a unidirectional USB device.

11. The method of claim 9, wherein detecting that the remote session has been disconnected comprises receiving a session disconnect notification.

12. The method of claim 9, wherein the specified amount of time comprises a session reconnection time period during which the agent attempts to restore the remote session.

13. The method of claim 9, wherein, when the remote session is restored within the specified amount of time, the agent determines whether the device is also reconnected over the remote session.

14. The method of claim 13, wherein determining whether the device is also reconnected over the remote session comprises comparing device information received from the proxy after the remote session is restored to device information that was received from the agent before the remote session was disconnected.

15. The method of claim 9, wherein, in response to the remote session being disconnected, the agent also instructs a virtual bus driver to cause any new I/O requests directed to the device to be completed with a retry error status.

16. The method of claim 15, wherein, when the remote session is restored within the specified amount of time, the agent also instructs the virtual bus driver to allow any new I/O requests directed to the device to be processed and forwarded to the agent.

17. A virtual desktop infrastructure environment comprising:
   a proxy that is configured to execute on a client; and
   an agent that is configured to execute on a server, the proxy and agent interacting to establish a remote session including to redirect a device to the server for use within the remote session;
   wherein, when the remote session is disconnected, the proxy and the agent are each configured to enable I/O requests pertaining to the device to be resumed after the remote session is restored by performing the following:
      queuing any I/O requests pertaining to the device that are received after the remote session is disconnected;
      waiting for a specified amount of time after the remote session is disconnected; and
      when the remote session is restored prior to the specified amount of time elapsing, sending the queued I/O requests over the restored remote session.

18. The virtual desktop infrastructure environment of claim 17, wherein, in response to the remote session being disconnected, the agent is further configured to instruct a virtual bus driver to cause any new I/O requests pertaining to the device that are received during the specified amount of time to be completed with a retry error status.

19. The virtual desktop infrastructure environment of claim 18, wherein, when the remote session is restored prior to the specified amount of time elapsing, the agent is further configured to instruct the virtual bus driver to cease causing any new I/O requests pertaining to the device to be completed with a retry error status.

20. The virtual desktop infrastructure environment of claim 17, wherein, when the remote session is not restored prior to the specified amount of time elapsing, the agent completes the I/O requests queued at the server with an error status and removes the device from the server, and the proxy discards the I/O requests queued at the client and causes the device to be connected to the client.

* * * * *